United States Patent [19]

Forler et al.

[11] Patent Number: 4,780,162
[45] Date of Patent: Oct. 25, 1988

[54] METHOD FOR REPAIRING LAMINATES

[75] Inventors: C. Richard Forler, St. Petersburg; David L. Voss, Clearwater; Richard G. Forler, Pinellas Park; Marcia J. Lunt, St. Petersburg, all of Fla.

[73] Assignee: E-P Corporation, St. Petersburg, Fla.

[21] Appl. No.: 789,347

[22] Filed: Oct. 21, 1985

Related U.S. Application Data

[63] Continuation of Ser. No. 704,896, Feb. 22, 1985, abandoned, which is a continuation of Ser. No. 546,809, Oct. 31, 1983, abandoned, which is a continuation of Ser. No. 413,079, Aug. 30, 1982, abandoned.

[51] Int. Cl.$^4$ .............................. B32B 35/00
[52] U.S. Cl. ...................... 156/94; 156/256; 156/286; 156/293; 264/36; 425/12; 425/13
[58] Field of Search ............... 156/73.1, 94, 254, 286, 156/344, 293, 256; 264/36, 22; 425/12, 13

[56] References Cited

U.S. PATENT DOCUMENTS

| | | | |
|---|---|---|---|
| 3,494,811 | 2/1970 | Henry | 156/257 |
| 3,765,975 | 10/1973 | Hollingsworth | 156/94 |
| 3,841,932 | 10/1974 | Forler et al. | 156/390 |
| 4,073,094 | 2/1978 | Walz | 156/293 |
| 4,085,919 | 4/1978 | Sullivan | 264/2.2 |
| 4,200,478 | 4/1980 | Sacino et al. | 156/102 |

Primary Examiner—Jay H. Woo
Assistant Examiner—Timothy W. Heitbrink
Attorney, Agent, or Firm—Dominik, Stein, Saccocio & Reese

[57] ABSTRACT

A method is disclosed for repairing laminates such as aircraft transparency windows in which two plies of the laminate have become separated and created a void. The method of the invention basically comprises the steps of selecting an adhesive having a viscosity sufficient to flow into the void formed between the two separated plies and then introducing an amount of the adhesive into the void such that the adhesive fills substantially all of the void thereby repairing the laminate. The preferred technique for introducing the adhesive into the void comprises the steps of filling a syringe with an amount of the adhesive, affixing a hypodermic needle to the syringe, and forcing the needle into the void of the delaminated area. The syringe is then operated to force the adhesive into the void until the void is completely filled with the adhesive.

22 Claims, 4 Drawing Sheets

METHOD FOR REPAIRING LAMINATES

This is a continuation of co-pending application Ser. No. 06/704,896 filed on Feb. 22, 1985 now abandoned, which is a continuation of Ser. No. 06/506,809, filed on Oct. 31, 1983 now abandoned, which is a continuation of Ser. No. 413,079, filed Aug. 30, 1982 now abandoned.

BACKGROUND OF THE INVENTION

1. Field of the Invention

This invention relates to methods for repairing laminates comprising two or more plies of the same or different material. More particularly, this invention relates to methods for introducing an adhesive in the delaminated area between the plies which have become separated.

2. Description of the Prior Art

A laminate is a composition of materials which usually includes three or more plies of material; typically, two or more layers of material have the desired characteristics and an adhesive layer which bonds such nonadhesive layers together. The aspect of bonding two materials together, each material having the same or different characteristics can yield a laminate which is much more desirable for a particular purpose than a sheet of homogeneous material. Accordingly, the use of laminates has proliferated in the past and will continue to proliferate for many years to come.

One major disadvantage to laminates is their tendency to delaminate under certain conditions or after a certain length of time. Upon delamination, the desired characteristics of the laminate (strength, durability, light transmittance characteristics, etc.) are substantially and adversely effected. Further, once the delamination forms, it rapidly spreads throughout the entire laminate. These problems are so acute in the industry that it is common practice to virtually replace the entire laminate even when only two plies have become delaminated. Obviously, the requirement for replacing the entire laminate is extremely costly not only from the pure expense involved but also with respect to down time of the apparatus which utilizes the laminate.

Various efforts have been made to repair a delaminated laminate. Those efforts have basically included methods for cutting into the laminate to remove the delaminated area and then rebonding a new section of a laminate or homogeneous material in the opening thus formed. The other methods have included various techniques for bonding a patch over the delaminated area, or affixing a patch about the delaminatd area by means of rivets or other fasteners. Some techniques have included a combination of both bonding and affixing of the patch about the delaminated area. When the delaminated area includes a perforated area, it is common practice to glue a sheet of fiberglass material over the patch to prevent contamination and moisture from passing through the perforation.

A particular type of industry in which laminates are widely used, is the transparency industry for making aircraft windows and the like. In this particular industry, the aircraft window typically comprises two to five plies of an acrylic material which are bound together by interposed adhesive plies. A scratch resistive ply, such as glass, is then affixed to the opposing side of the acrylic plies by similar adhesive plies. Usually, an electrically conductive ply is meshed between the outer glass ply and the outer-most acrylic ply to enable electrical current to flow therethrough to heat the window, thereby preventing ice formation on the window during flight.

The primary disadvantage to transparency laminates is their tendency to delaminate about their peripheral edges within two to five years of service. The delamination at the edges of the transparency quickly grows to such a point that the transparency has to be discarded and a new one reinstalled. It is contemplated that this delamination occurs at such an early stage due to the inherent environment in which the aircraft are exposed; namely, jet fuel contaminates and moisture ingress through seals of the frame, extreme temperatures and a certain amount of flexing of the laminate.

It is an object of this invention to provide an improved method which overcomes the aforementioned inadequacies of the prior art methods and provides and improvement which is a significant contribution to the advancement of the art of repairing laminates.

It is another object of this invention to provide a method for repairing laminates in which the delaminated plies are adhesively bound together to substantially achieve the original characteristics of the laminate.

Another object of this invention is to provide a method for repairing laminates which can be performed at a cost substantially less than the original cost of the laminate.

Another object of this invention is to provide a method for repairing laminates in which an adhesive, compatible with the adjoining plies, is introduced into the delaminated area.

Another object of this invention is to provide a method for repairing laminate which eliminates the need to cut into the laminate and remove the delaminated area.

Another object of this invention is to provide a method for repairing a laminate which eliminates the need to apply a patch to the delaminated area in order to repair the same.

Another object of this invention is to provide a method for repairing a laminate in which the laminate has become delaminated about its peripheral edges.

Another object of this invention is to provide a method for repairing transparency laminates commonly used in the aircraft industry.

Another object of this invention is to provide a method for repairing aircraft transparency laminates without adversely effecting the electrical heating ply positioned within the transparency laminate.

The foregoing has outlined some of the more pertinent objects of the invention. These objects should be construed to be merely illustrative of some of the more prominent features and applications of the intended invention. Many other beneficial results can be attained by applying the disclosed invention in a different manner by modifying the invention within the scope of the disclosure. Accordingly, other objects and a fuller understanding of the invention maY be had by referring to the summary of the invention and the detailed description describing the preferred embodiment in addition to the scope of the invention defined by the claims taken in conjunction with the accompanying drawings.

SUMMARY OF THE INVENTION

The invention is defined by the appended claims with a specific embodiment shown in the attached drawings.

For the purpose of summarizing the invention, this invention relates to methods for repairing laminates. Basically, the method of the invention utilizes one or more techniques for introducing an amount of an adhesive into the delaminated area of the laminate to fill substantially all of the void within the delaminated area thereby repairing the laminate. The adhesive which is introduced into the delaminated area must have a viscosity sufficient to flow into the void. The specific techniques of the method of the invention ar primarily concerned with the manner in which the adhesive is introduced into the delaminated area to completely fill the same, such that the laminate will be restored to its original condition.

More particularly, the techniques of the method of the invention are described in accordance with the repair of transparent laminates such as aircraft windows and the like. With respect to these laminates, the delamination typically occurs about the peripheral edges due to the contaminants in the air, such as jet fuel contaminants and moisture ingress through the seal of the frame, extreme temperature variations among the various plies of the laminate, pressure differentials existing between the interior and exterior of the aircraft, and the general environment in which the aircraft windows are usually serviced and maintained. The preferred technique of the method of the invention contemplates the selection of an adhesive which has a viscosity sufficient to flow into the void of the delaminated area and then introducing such adhesive by means of a syringe and hypodermic needle combination, into the void until the void is substantially or completely filled with the adhesive. Additional adhesive is forced into the delaminated area as the needle is withdrawn such that the channel formed by the needle is also filled with the adhesive. The other techniques contemplated by the method of the invention disclose other methods for accomplishing the same result, and may be more desirable than the preferred technique for some manufacturers.

The foregoing has outlindd rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It shoud be appreciated by those skilled in the art that the conception and the specific method disclosed may be readily utilized as a basis for modifying or designing other methods for carrying out the same purpose of the present invention. It should also be realized by those skilled in the art that such equivalent methods do not depart from the spirit and scope of the invention as set forth in the appended claims.

BRIEF DESCRIPTION OF THE DRAWINGS

For a fuller understanding of the nature and objects of the invention reference should be had to the following detailed description taken in connection with the accompanying drawings in which.

DETAILED DESCRIPTION OF THE PREFERRED EMBODIMENT

Figure 1:
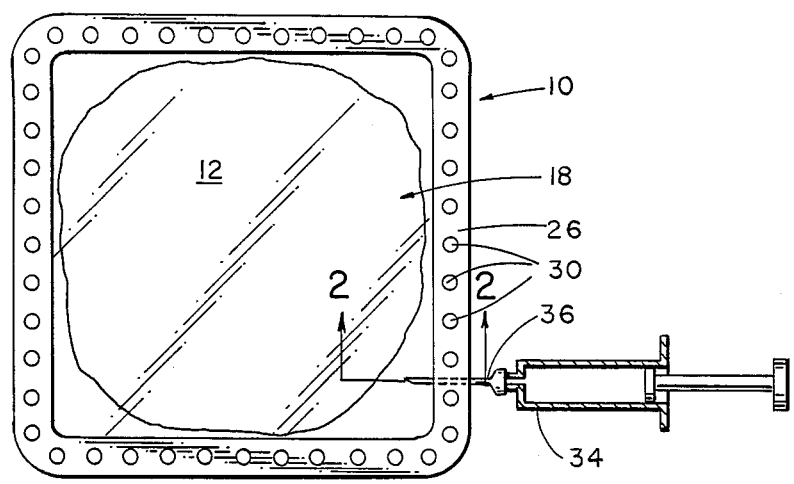
FIG. 1 is a plan view of an aircraft window illustrating the manner in which the syringe and hypodermic needle combination is inserted through the seal member into the void of the plies of the laminate which have become separated.
Figure 2:
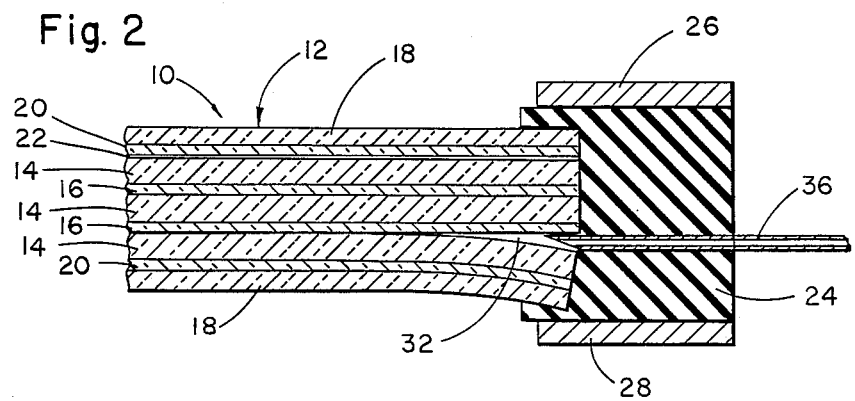
FIG. 2 is cross-sectional view of FIG. 1 along lines 2—2 illustrating the end of the hypodermic needle positioned within the void of the delaminated area.

Referring to FIGS. 1 and 2, it is seen that a typical aircraft window 10 comprises a transparent laminate 12 having several acrylic plies 14 adhered together by means of corresponding adhesive plies 16. A scratch resistant ply 18, such as glass, is adhered to the exposed surfaces of the acrylic plies 14 by similar adhesive plies 20. Usually, an electrically resistive ply 22, formed by vapor deposition or through the use of resistive wires, is positioned between the exterior glass ply 18 and the outermost acrylic ply 14 such that, when the electrical energy is applied thereto, the outer glass ply 18 is heated to a temperature sufficient to prevent ice formation about the exterior of the aircraft window 10.

A seal member 24 is positioned about and overlaps the peripheral edge of the laminate 12. A pair of opposing frame members 26 and 28 are positioned about opposing sides of the seal member 24 in order to provide rigidity thereto. Finally, spacers 30 are inserted through holes in the frame member 26 and 28 and the seal member 24. The spacers 30 function to receive the fastener which affixes the window 10 into position, while preventing damage to the laminate 12 due to over-tightening of the fasteners.

After the aircraft window 10 is in service for two to five years, sometimes earlier, the transparent laminate 12 begins to delaminate about portions of its periphery, usually the corners. Experience has indicated that once the delamination begins, the rate of delamination steadily increases with time. In fact, as a general rule, the rate of delamination is directly proportional to the size of the delamination. Such delamination can become so severe that the outer glass or acrylic plies 18 and 14 become separated from the other plies during flight. Of course, this is potentially a very hazardous condition. Additionally, it is noted that the aircraft pilot's performance could be hindered if the delamination were permitted to extend into his field of view.

The method of the invention for repairing the aircraft window 10 includes the steps of selecting an additional adhesive having a viscosity sufficient to flow into the void of delaminated area 32 formed between two separated plies, and then introducing an amount of such additional adhesive into the delaminated area 32 until the void of the delaminated area 32 is substantially or entirely filled with the additional adhesive contacting the original adhesive and the seal as well as the facing surfaces of the piles. The window 10 will then be repaired to a substantially new condition.

Obviously, it is important to select an adhesive which is compatible with the materials constituting the plies of the laminate 12. The following is a list of some physical and chemical properties of adhesives which may be suitable depending on the particular materials constituting the plies. The adhesive, as noted earlier, should have a viscosity such that it is readily dispensed and flows easily into the delaminated areas and remains bubble-free throughout the process. The adhesive should completely wet all contacted surfaces. For transparent applications such as aircraft windows, the adhesive should have high light transmission, low color and low haze and be capable of retaining such optical properties throughout its service. The adhesive should be compatible with all the materials constituting the plies in which it is contacted; typical plies for a air craft window 10 comprising materials such as glass, acrylic, polycarbonate, polyvinyl butyral, polyurethane, silicone elastomeric inter layers, and conductive coatings such as gold, tin-oxide, and indium tin oxide. The adhesive must provide sufficient adhesion to each material such that an acceptable bond is provided and subsequent delamination is eliminated. If used on the electrically heated ply 22, the adhesive should have a resistance greater than the resistance of the heating ply 22 such that the heating charaCteriStics of the ply 22 will not be affected Preferably, the adhesve can react-cure (polymerize) without any external aids such as increased temperature or ultra violet radiation. The adhesive should completely react without any exothermic reaction, evolution of volatiles, and with minimal shrinkage. The adhesive should be resistant to the effects of moisture and other contaminants that may be present within the delaminated window and, after curing, should be resistant to ultra violet radiation, moisture, contamination, and depressed and elevated temperatures. The adhesive should not degrade (discolor, crack, etc.) or lose adhesion after severe thermal shock or for mechanical stresses imposed in service. With respect to nontransparent applications, the adhesive may be reinforced (strengthwise) by incorporating appropriate fillers such as silica, carborundum, metallic powders and carbon or boron fibers. Where necessary, the adhesive may be modified by the addition of compatible solvents or plasticisers. Typical chemical types of the adhesive that may be used are based on, but not necessarily limited to, monomers of acrylic, polyester, urethane, epoxy, silicone or derivatives of the same.

It is understood that any liquid monomer adhesive can be used, provided that after polymerization, the end-product meets the above-described requirements. However, for the purposes of the claims appended hereto, the term "adhesive" is defined to mean any substance which functions to adhere the delaminated plies together when the substance is introduced therein and shall not be limited, unless so claimed, to those substances which include any or all of the above-listed characteristic.

The following is a discussion of the preferred and other techniques for introducing the adhesive into the delaminated area 32 such that the adhesive completely fills or substantially fills all of the voids therein.

Preferred Technique

The preferred technique for introducing the adhesive into the delaminated area 32 comprises first, heating the laminate 12 in a hot air bath or by applying electrical energy to the heating ply 22 enabling it to heat itself. The laminate 12 should be heated to an appropriate temperature to soften the selected plies to be repaired. The laminate 12 is then checked for noticable openings around the seal member 24 and the frame members 26 and 28. If any noticable openings are located, they must be sealed with either tape or a caulking sealant such that the adhesive, once introduced into the delaminated area 32 is prevented from leaking therefrom until it is sufficiently cured. Additionally, the sealing of the noticable openings prevents air from intruding back into the delaminated area 32 as the adhesive is introduced therein.

After the lamina.te is heated and its noticable openings sealed, the proper seam and level (plies) of the laminate 12 where the delamination has occured is located. A small opening is made in the seal member 24 in a position between the delaminated plies. A syringe 34 is filled with the adhesive. If any air becomes trapped in the syringe 34, it is removed by inverting the syringe 34 and forcing the air bubble out the needle 36. The syringe 34 is then fitted with a hypodermic needle 36.

The needle 36 is then threaded through the opening in the seal member 24 and forced into the delaminated area. It is noted that if the delamination does not extend to the edge of the laminate 12, the needle 36 may be forced between the plies until it reaches the area of the delamination.

The plunger of the syringe 34 is then operated to force the adhesive to flow into the delaminated area 32. If it becomes necessary to refill the syringe 36 with the adhesive, approximately one-eighth of a cc is left in the syringe 34 and the syringe 34 is disconnected from the needle 36 such that the needle 36 reains between the plies. After the syringe 34 is refilled with the adhesive, it is properly fitted to the needle 36. If any air has entered into the needle 36, the plunger of the syringe 34 is pulled outward to draw out any such air that may have entered the needle 36. The syringe 34 is again operated to force the adhesive into the delaminated area 32. When the additional adhesive from the syringe is inserted into the delaminated area or void between the plies, such additional adhesive will contact the plies, the original adhesive and the adjacent seal to generate a force tending to move apart the contacted plies. This force will be opposed by forces of the seal and frame members in addition to the force of the original adhesive in a central extent between the plies holding the plies together.

If it appears that the void of the delaminated area 32 is not filling properly, the plunger of the syringe 34 may be pulled back to draw both the trapped air and some adhesive from the void. This enables the remaining adhesive to flow in behind to displace the air. Additionally, the laminate 12 may be elevated such that the air contained within the void is caused to rise to the top of the laminate 12 while the adhesive flows in behind to displace the air. This process can be enhanced by drawing back on the plunger of the syringe 34 until the air is drawn up into the syringe 34. Alternatively, or in combination with the foregoing, an empty syringe and needle combination may be inserted into another area of the delaminated area 32 and operated to draw therein the air contained in the delaminated area 32.

After the void is filled or substantially filled with the adhesive, the needle 36 of the syrinqe 34 is slowly withdrawn while slowly forcing the adhesive out of the syringe 34 to fill the opening behind the needle. This seals all openings and prevents any air intrusion.

Technique No. 2

Figure 3:
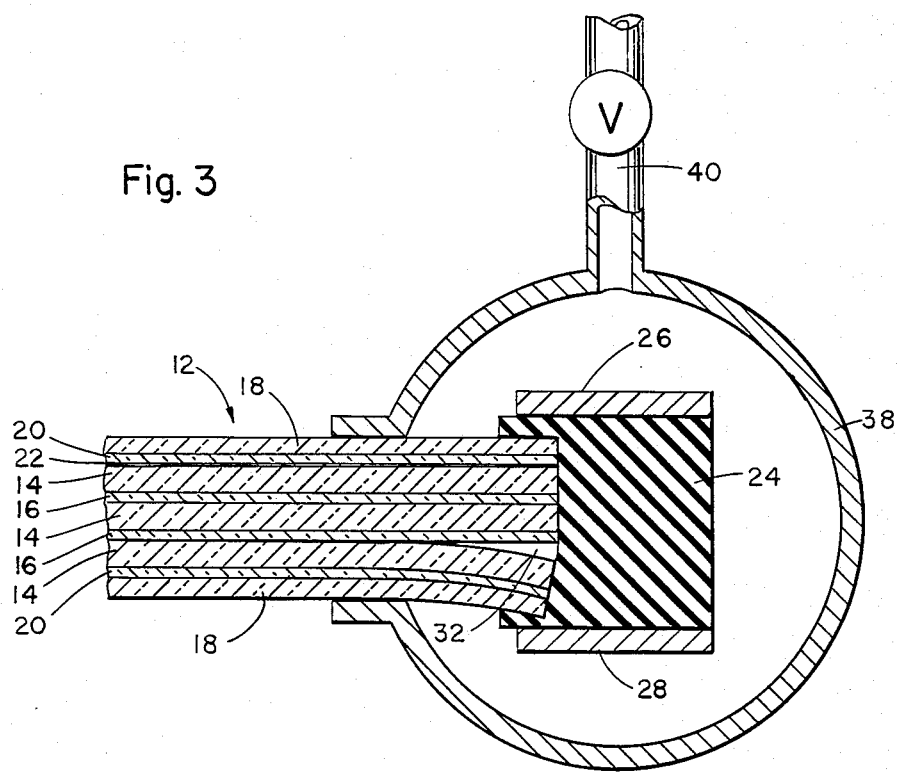
FIG. 3 is a partial cross-sectional view of the ring seal of the invention positioned about the edge of the aircraft window.
Figure 4:
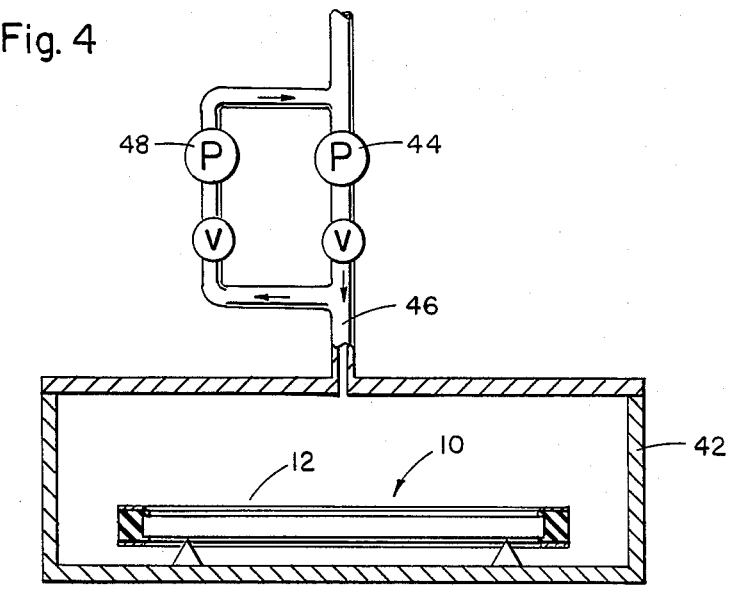
FIG. 4 is a partial cross-sectional view of the chamber in which the aircraft window is positioned to accomplish one particular technique of the method of the invention.

Referring to FIG. 3, the second technique for introducing the adhesive into the void formed by the delamination, comprise the steps of affixing a ringseal 38 about all or a portion of the periphery of the window 10. An input conduit 40 is then connected in fluid communication with the interior of the ringseal 38 at one portion of the ringseal 38, and an output conduit (not shown) is similarily connected in fluid communication with the interior of the ringseal 38 at another portion thereof. The adhesive is then forced into the ringseal 38 via input conduit 40 while the output conduit is opened to permit the air to escape therefrom. When the ringseal 38 is substantially full of the adhesive, the output conduit is closed. As the adhesive is further forced into the ringseal 38, the air trapped within the delaminated area 32 will be forced therefrom via leaks in the seal member 24, thereby permitting the adhesive to flow therein. When it appears that the void of the delaminated area 32 has been filled or substantially filled with the adhesive, the excess adhesive is drained from the ringseal 38 via input 40 and output conduits. The ringseal 38 is then removed from the peripheral edge of the window 10.

Technique No. 3

The third technique for introducing the adhesive into the void of the delaminated area 32, comprises covering, to prevent getting adhesive all over the window 10, and sealing, to prevent creation of additional voids, the laminate 12 except where the delamination area extends to the outer peripheral edge of the laminate 12. The laminate 12 is then put into a vacuum chamber 42 and vacuum is drawn down to 27 to 28 inches of mercury. This functions as a dryer to remove any moisture that may be present within the delaminated area 32. After vacuum has been drawn and the laminate 12 sufficiently dried, the chamber 42 is completely filled with the adhesive by a pump 44 and input conduit 46. While the chamber 42 is completely full with adhesive, pump 48 is operated to pump approximately 10% of the volume of the chamber 42 back into the reservoir containing the adhesive. This creates a vacuum within the chamber and correspondingly, a vacuum in the void of the delaminated area. The air trapped in the void is therefore encouraged to flow out of the laminate 12 by virtue of the force of the adhesive being drawn into the void. This procedure is repeated several times until the delaminated area 32 has been completely filled with the adhesive, at which time all of the adhesive is drawn from the chamber 42 and the laminate 12 removed.

Technique No. 4

Figure 5A:
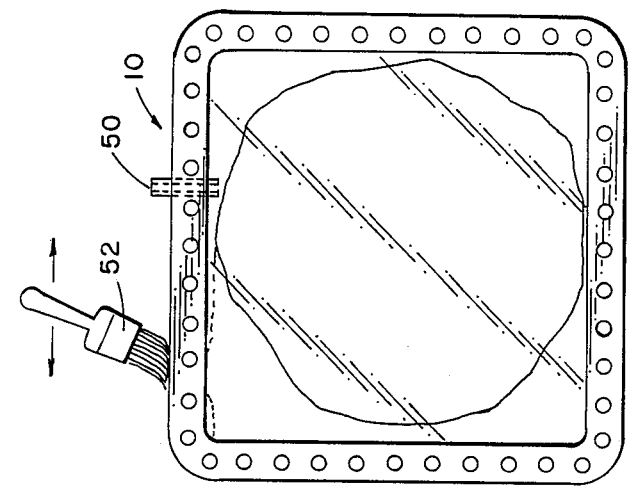
FIGS. 5A, B, and C are schematic illustrations of another technique of the method of the invention which utilizes capillary action to introduce the adhesive into the void of the delaminated area.
Figure 5B:
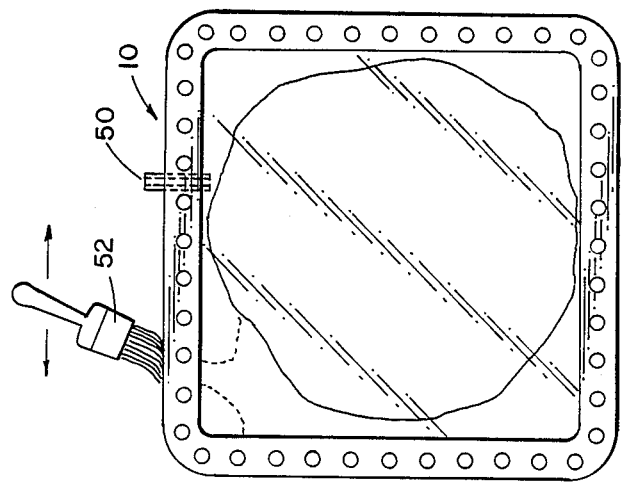
Figure 5C:
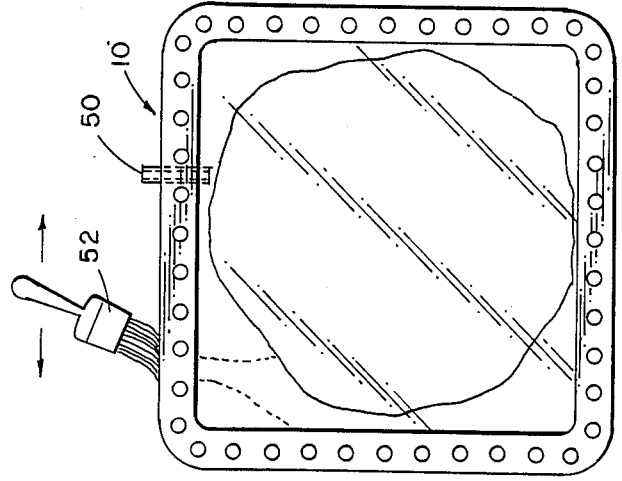

The fourth technique of the method of the invention for introducing the adhesive into the delaminated area 32 is illustrated in FIGS. 5A, 5B, and 5C. Basically, this technique comprises the step of providing an air outlet 50 at the peripheral edge of the laminate 12. A brush 52, soaked with the adhesive, is brushed across the opening of the separates plies such that the adhesive is allowed to fill the void therein by capillary action. As the brush 52 is repeatedly soaked with adhesive and brushed across the opening, the air outlet 52 permits the air to escape from the void. When the void is completely filled with adhesive, the air outlet 50 is removed.

Technique No. 5

Figure 6:
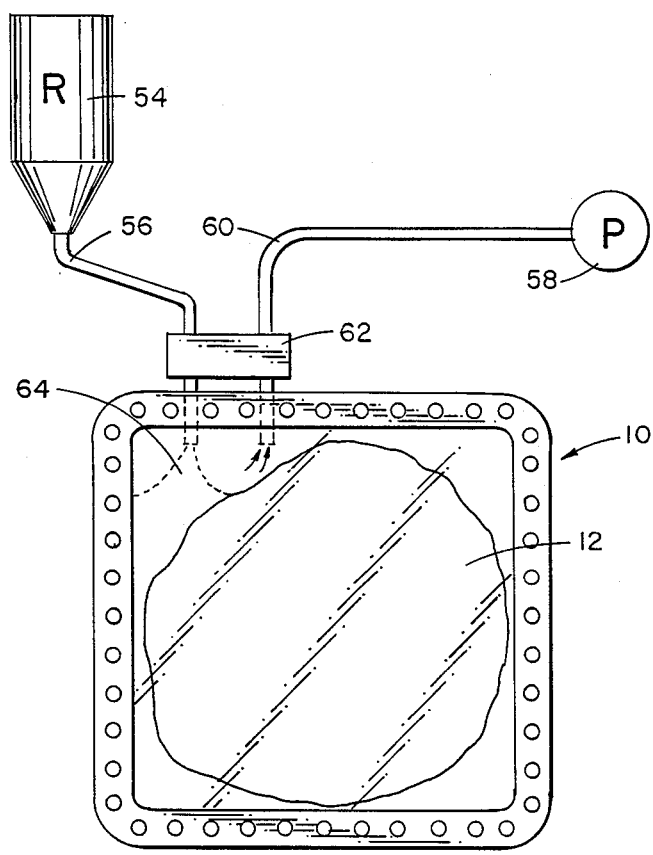
FIG. 6 is a schematic representation of the fifth technique for introducing the adhesive into the void of the delaminated area.

FIG. 6 illustrates another technique for introducing the adhesive into the void of the delamination. More particularly, this fifth technique comprises a reservoir 54 which is filled with the adhesive. The reservoir includes a conduit 56 which extends downwardly therefrom. A vacuum pump 58 is provided with a similar conduit 60. The two conduits 56 and 60 are rigidly affixed together by means of a applicator/connector 62. During use, the ends of the conduits 56 and 60 are forced through the peripheral edge of the laminate 12 into the void of the delamination 32. Th entire opened surface of the void is then sealed with a sealant 64. Vacuum pump 58 is operated to draw the air contained within the void therefrom, at which time the adhesive contained within the reservoir 54 flows into the void. When the void is filled with the adhesive, the applicator/connector 62 is removed.

Technique No. 6

Figure 7:
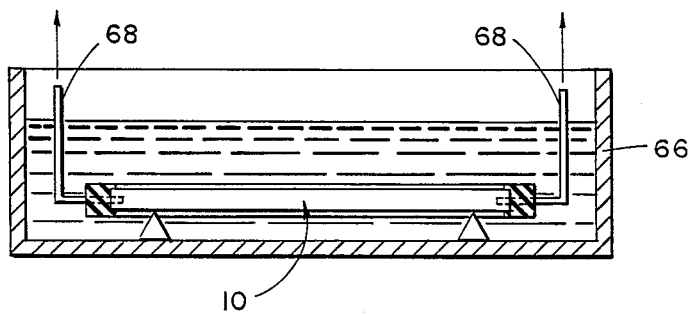
FIG. 7 is a cross-sectional view of the ultrasonic container in which the aircraft window is immersed and subject to ultrasonic vibrations.

As shown in FIG. 7, the sixth technique comprises submerging the laminate 12 into a container 66 containing the adhesive. Conduits 68 are connected to be in fluid communication with the voids of the delaminated areas 32 of the laminate 12 and extend above the surface of the adhesive. The adhesive and correspondingly, the laminate 12 are subjected to ultrasonic waves. Such wave motion encourages the air trapped within the voids of the delaminated areas 32 to escape therefrom, thereby permitting the adhesive to enter and fill the voids of th delaminated areas 32. It is noted that the wave action produced by the ultrasonic waves enhances the introduction of the adhesive into the voids of the delaminated areas 32.

The foreoing has described the various techniques of the method of the invention in relation to an aircraft window 10. It shall be understood that the description of such techniques were for illustrative purposes only. Many other techniques for introducing the adhesive into the voids of the delaminated areas may be utilized without departing from the spirit and scope of this invention. Additionally, it shall be understood that the techniques of the method of the invention may be utilized to repair any type of laminates 12 in addition to aircraft windows 10.

The present disclosure includes that contained in the appended claims as well as that of the foregoing description. A though this invention has been described in its preferred form with a certain degree of particularity, it is understood that the present disclosure of the preferred form has been made only by way of example and that numerous changes in the specific steps of the method may be resorted without departing from the spirit and scope of this invention.

Now that this invention has been described:
What is claimed is:

1. A method for repairing a laminate in which two indivdual plies composed of different materials previously adhered together have separated at a peripheral edge thereof thereby creating void between the individual plies, comprising the steps of:
   selecting an adhesive having a viscosity sufficient to flow into the void formed between the two separated plies; and
   introducing an amount of the adhesive from the peripheral edge of the laminate into the void formed between the two separated plies in a direction parallel to the two separated plies, whereby the adhesive fills substantially all of the void between the two separated plies thereby of the void between the two separated plies thereby readhering the two separated plies and repairing the laminate.

2. The method as set forth in claim 1 further including the step of repeatedly withdrawing and reintroducing a portion of the adhesive into the void until substantially all of the air trapped in the void has escaped therefrom.

3. The method as set forth in claim 1, further including the step of elevating the opened area of the void with respect to the remainder areas of the void to permit any air trapped in the void to flow from the void.

4. The method as set forth in claim 1, further including the step of introducing an additional amount of the adhesive into the void such that the adhesive flows out of the void.

5. The method as set forth in claim 1, wherein the step of introducing the adhesive into the void comprises the steps of:
filling a syringe with the adhesive;
affixing a hypodermic needle thereto;
inserting the hypodermic needle into the void from the peripheral edge of the laminate in a direction parallel to and between the separated plies such that neither ply is pieeced by the hypodermic needle; and
operating the syringe to force the adhesive therefrom directly into the void.

6. The method as set forth in claim 5, further including the step of heating the laminate in the area of the void to soften the plies and increase the ease in which said needle is inserted into the void.

7. The method as set forth in claim 1, wherein the step of introducing the adhesive into the void comprises the steps of affixing a fluid container about a portion of the opened area of the void and pressurizing the container to force the adhesive to flow therefrom into the void.

8. The method as set forth in claim 1, wherein the step of introducing the adhesive into the void comprises the steps of submersing the laminate into a tank containing the adhesive and pressurizing the tank to force the adhesive into the void.

9. The method as set forth in claim 1, wherein the step of introducing the adhesive into the void comprises the steps of placing the laminate into a chamber filled with the adhesive and then withdrawing a portion of the adhesive from the closed chamber to create a vacuum in the void thereby encouraging the adhesive to flow into the void.

10. The method as set forth in claim 9, wherein the step of withdrawing a portion of the adhesive from the chamber is repeated until the void is completely filled with the adhesive.

11. The method as set forth in claim 1, wherein the step of introducing an amount of the adhesive into the void comprises the steps of:
providing an outlet oor the air contained within the void to readily escape therefrom;
saturating a brush with the adhesive; and
brushing the brush across the opening of the void to cause the adhesive to flow, by capillary action, from the brush into the void.

12. The method as set forth in claim 11, wherein the step of brushing the brush across the opening of the void is repeated until the void is completely filled with the adhesive.

13. The method as set forth in claim 1, wherein the step of introducing an amount of adhesive into the void comprises the steps of:
providing a reservoir containing the adhesive;
connecting the reservoir in fluid communication with the void so as to permit the adhesive contained therein to flow into the void; and
connecting a reduced pressure source in fluid communication with the void to create a reduced pressure in the void thereby enhancing the flow of the adhesive from the reservoir into the void.

14. The method as set forth in claim 13, further including the step of sealing the opening of the void after the reservoir and the reduced pressure source are connected in fluid communication with the void.

15. The method as set forth in claim 1, wherein the step of introducing an amount of the adhesive into the void comprises the steps of:
submerging the laminate within a body of the adhesive; and
vibrating the adhesive to encourage the air trapped within the void to be displaced by the adhesive.

16. The method as set forth in claim 15, further including the step of providing means for connecting the void in fluid communication with the atmospheric air surroun ing the body of adhesive to provide a path for the air escaping from the void.

17. A method of repairing, comprising the steps of:
providing a laminate in which two individual plies composed of different materials previously adhered together by original adhesive adhered to their facing surfaces have become separatd at a peripheral edge thereof creating a void between the individual plies and between the original adhesive and the peripheral edge;
selecting an additional adhesive having a viscosity sufficient to flow into the void; and
introducing an amount of the additional adhesive from the peripheral edge of the laminate into the void such that the additional adhesive fills substantially all of the void by filling a syringe with the additional adhesive, affixing a hypodermic needle thereto, inserting the hypodermic needle into the void from the peripheral edge of the laminate in a direction parallel to and between the separated plies such that neither ply is pierced by the hypodermic needle, and operating the syringe to force additional adhesive therefrom directly into the void.

18. The method as set forth in claim 17, wherein the step of providing a laminate comprises providing an aircraft window laminate having a fixed frame and a fixed seal about its periphery, the seal covering the peripheral edge of the laminate and wherein the step of introducing an amount of adhesive comprises the step of inserting the hyperdomic needle through the fixed seal into the void.

19. The method of repair as set forth in claim 18, wherein the fixed seal is watertight and seals the peripheral edge of the laminate from the pressurized flow of gases and liquids.

20. The method of repair as set forth in claim 19, wherein the fixed seal is not removed during the repair.

21. A method of repairing, comprising the steps of:
providing a laminate in which two individual plies, secured together at their periphery by seal means and previously adhered together by original adhesive adhered to their facing surfaces, have become separated at a peripheral edge thereof creating a void between the indivdual plies and between the original adhesive and the seal means;

selecting an additional adhesive having a viscosity sufficient to flow into the void and adhere to the facing surfaces of the plies while contacting the original adhesive and the seal means; and introducing an amount of the additional adhesive from the peripheral edge of the laminate into the void such that the additional adhesive fills substantially all of the void, and adheres to the two separated plies while contacting the original adhesive and the seal means and thereby repairs the laminate.

22. A method of repairing, comprising the steps of:

providing a laminate in which two individual plies, secured together at their periphery by seal means and previously adhered together by original adhesive adhered to their facing surfaces, have become separated at a peripheral edge thereof creating a void between the individual plies and between the original adhesive and the seal means;

selecting an additional adhesive having a viscosity sufficient to flow into the void and adhere to the facing surfaces of the plies whiel contacting the original adhesive and the seal means;

applying a first force to the facing surfaces of the separated plies from the void tending to move apart the separated plies by introducing an amount of the additional adhesive under pressure into the void from the peripheral edge of the laminate; and applying a second force to the facing surfaces of the separated plies by the original adhesive and seal means tending to resist the first force whereby the additional adhesive fills substantially all of the void thereby adhering the two separated plies, the original adhesive and the seal measn and repairing the laminate.

\* \* \* \* \*